(12) United States Patent
Noble et al.

(10) Patent No.: US 8,208,807 B2
(45) Date of Patent: Jun. 26, 2012

(54) TRANSMISSION OF EYE INFORMATION FROM OPTO-ELECTRONIC MODULES

(75) Inventors: Gayle L. Noble, Boulder Creek, CA (US); Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 876 days.

(21) Appl. No.: 12/272,062

(22) Filed: Nov. 17, 2008

(65) Prior Publication Data

US 2010/0124418 A1 May 20, 2010

(51) Int. Cl.
*H04B 10/08* (2006.01)
*H04B 17/00* (2006.01)
*H04B 10/12* (2006.01)

(52) U.S. Cl. .................. 398/9; 398/22; 398/149

(58) Field of Classification Search ............... 398/9, 22, 398/23, 24, 25, 135, 138, 149
See application file for complete search history.

(56) References Cited

U.S. PATENT DOCUMENTS 8,041,226 B2 * 10/2011 Kato .......................... 398/136
* cited by examiner

*Primary Examiner* — Armando Rodriguez
(74) *Attorney, Agent, or Firm* — Maschoff Gilmore & Israelsen

(57) ABSTRACT

A method of controlling communication between transceivers includes transmitting payload data from a transmitter of a first transceiver in a data channel of a physical link to a receiver of a second transceiver, the second transceiver further including an equalizer, varying equalizer settings in the equalizer, analyzing effects of varying equalizer settings to determine transmitter diagnostic settings for the first transceiver, and transmitting the transmitter diagnostic settings from a transmitter of the second transceiver in an out-of-band channel of a physical link to a receiver of the first transceiver a second transceiver in a data channel.

23 Claims, 2 Drawing Sheets

TRANSMISSION OF EYE INFORMATION FROM OPTO-ELECTRONIC MODULES

CROSS-REFERENCE TO RELATED APPLICATIONS

Not Applicable.

BACKGROUND OF THE INVENTION

1. The Field of the Invention

The present invention relates to transmission of eye information and to transmission of eye information from optoelectronic modules in particular.

2. The Relevant Technology

As fiber optic transmission systems are pushed to higher data rates and longer transmission distances, they are often limited by one or another form of optical dispersion where there is a velocity spread in the components of the signal. This velocity spread tends to spread the optical pulses in time, which causes the pulses that make up the 0's and 1's of most transmission systems to spread into one another, leading to an impairment known as inter-symbol interference (ISI). As ISI increases, it will eventually destroy any clear distinction in the level of a 0 or a 1 (also known as closing the optical eye), which is the basis that most simple detection systems use to make an error free decision.

In these and other communication systems, testing for types of use, errors, and signal integrity can be advantageous. Often, problem identification, analysis, and resolution in communications systems involve capturing a portion of the network data traffic for review and analysis.

The use of electronic equalizers, very common in many other fields, such as radio transmission, copper-based high-speed electronic links, and disk drive read circuits, is now finding applications in optical transmission systems, where they can be used in optical receivers to successfully detect signals which are otherwise unusable in simple receivers. One particular approach includes the use of electronic dispersion compensation.

Electronic dispersion compensation (EDC) attempts to correct for the data waveshape distortions and resultant bit errors caused by the multiple paths and varying arrival times of each path in a fiber. EDC systems are implemented in the receiver with time-domain equalizers having multiple taps and some sort of a automated tuning algorithm that finds a combination of tap gains that improves the received signal by creating a distortion that is opposite and equal and, therefore, cancels the distortion caused by the transmission medium. This is a difficult task and while it helps a lot in some cases, it is quite imperfect and is performed "after the fact."

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

A method of controlling communication between transceivers includes transmitting payload data from a transmitter of a first transceiver in a data channel of a physical link to a receiver of a second transceiver, the second transceiver further including an equalizer, varying equalizer settings in the equalizer, analyzing effects of varying equalizer settings to determine transmitter diagnostic settings for the first transceiver, and transmitting the transmitter diagnostic settings from a transmitter of the second transceiver in an out-of-band channel of a physical link to a receiver of the first transceiver. As described herein, transmitter settings calculated in the second transceiver and/or tap settings transmitted to the first transceiver can be referred to as transmitter diagnostic data.

A transceiver module includes a transmitter; a receiver configured to receive a data payload from a physical link; an equalizer having operatively associated with the receiver, the equalizer system including a digital filter having a plurality of taps configured to apply gains to the data payload; and a control system operatively associated with the transmitter, the receiver, and the equalizer. The control system is configured to vary tap settings, to analyze results of varying the tap settings to determine transmitter diagnostic settings, and to cause the transmitter to transmit the transmitter diagnostic settings over a physical link in an out-of-band channel to a second transceiver.

A communication system includes a first transceiver having a control system operatively with a transmitter to transmit a data payload in a data channel over a physical link and a second transceiver having a receiver configured to receive the data payload over the physical link. The second transceiver further includes a receiver configured to receive a data payload from a physical link and an equalizer having operatively associated with the receiver, the equalizer system including a digital filter having a plurality of taps configured to apply gains to the data payload, and a control system operatively associated with the transmitter, the receiver, and the equalizer. The control system is configured to vary tap settings, to analyze results of varying the tap settings to determine transmitter diagnostic settings, and to cause the transmitter to transmit the transmitter diagnostic settings over a physical link in an out-of-band channel to the first transceiver.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
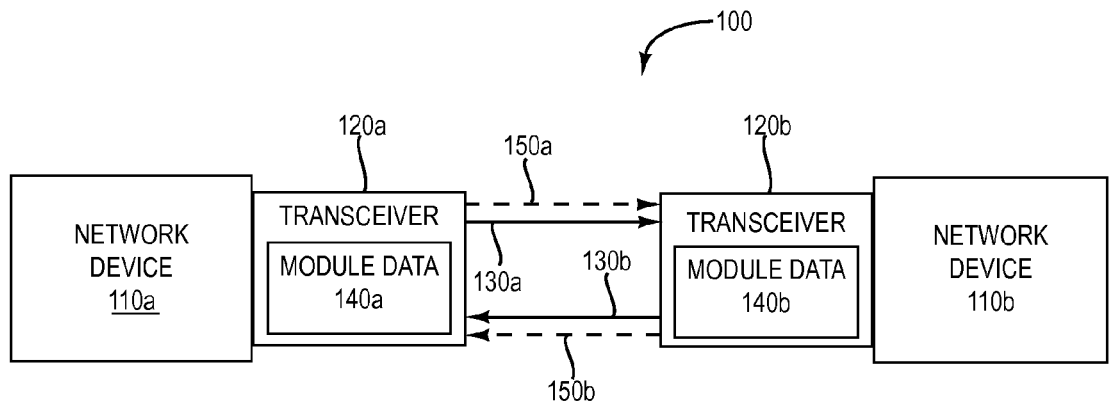
FIG. 1 illustrates communication between two transceiver modules according to one example.

Systems and methods are provided herein for optimizing communication between transceiver modules over a communication link, such as an optical link. In at least one example, a transmitter of a first transceiver sends a data payload over the optical link to a second transceiver. A receiver in the second transceiver receives the data payload. The second transceiver can include an electronic dispersion compensation controller (EDC controller) that compensates for dispersion of signals within the optical link, such as intersymbol interference (ISI). The EDC controller includes one or more digital filter having taps. One example of a digital filter is a finite impulse response filter. The taps apply gain inputs to the signal that can help to correct the dispersion of the signals described above.

The second transceiver can be configured to periodically vary tap settings in the digital filter. For example, the second transceiver can be configured to vary the tap settings. Varying the tap settings may result in performance variations of the filter. In particular, the performance of the filter can be described as such as by determining the "openness" of an eye diagram as calculated by a mean-squared error. Accordingly, varying the tap settings can result in variation in the mean-squared error, which provides an indication of how varying one or more of the tap settings affects the performance of the filter. The tap settings that yield improved results can then be used to calculate transmitter settings for use by the first transceiver in transmitting subsequent data payloads. For example, the second transceiver can use the tap settings to calculate transmitter settings for the first transceiver. The first transceiver can alternatively use the tap settings to calculate its own transmitter settings. The tap settings themselves as well as the calculated transmitter settings can be referred to generally as digital diagnostics, and either or both of these settings can be sent from the second receiver to the first receiver using out-of-band communication methods.

Accordingly, the EDC controller in a receiver may be enabled to manipulate the transmitter settings through OOB communication methods as part of the receiver's EDC tuning algorithm. The transmitter adjustments would appear to be "virtual taps" added to the receiver's existing EDC equalizer. Periodically, a packet of data containing the receiver's suggestions for the transmitter settings can then be sent back to the transmitter, which would adjust it's output accordingly. These packets would be small, conceivably as little as 10 bytes, so the inherently slow OOB data link would still give useful performance in real time. Such a system and method may eliminate the need for the DFE (Decision Feedback Equalizer) filter in the receiver altogether, and could simplify the FIR (Finite Impulse Response) filter required to achieve a given performance level. In particular, the transmitter's data dependent equalization is "feed forward" and can be less susceptible to oscillation attendant to DFE equalizers.

Referring to FIG. 1, a network 100 includes a number of network devices 110a, 110b. The network devices may be embodied as workstations, servers, switches, routers, host bus adapters, or the like. Transceiver modules 120a, 120b are coupled to each network device 110a, 110b and receive payload data by means of data channels 130a, 130b. In the illustrated embodiment, the transceiver modules 120a, 120b are optical transceivers. The transceiver modules 120a, 120b may conform to any industry standard form factor such as SFP, XFP, X2, XPAK, or XENPAK.

In at least one example, a typical bi-directional communication link includes two transceivers in which the first transceiver's transmitter is coupled to the second transceiver's receiver through an optical fiber and the second transceiver's transmitter is coupled to the first transceiver's receiver through an optical fiber. This can be done with two separate fibers or directional couplers or WDM techniques can be used to accomplish the communication on a single fiber. In any case, as will be described in more detail below, the two transceivers are mutually coupled together. In some systems, the two transceivers create a bidirectional side channel for the specific purpose of exchanging data between each other that does not interact with the payload data. This can be accomplished by providing each transmitter with a second modulator in addition to the payload data modulator which allows transmission of additional data to the associated receiver on the other end of the link in a frequency band outside of the payload data's frequency band. The corresponding receiver can be provided with a second detector sensitive to the second modulation signal in addition to the normal payload data modulation. Accordingly, the information needed by the first transceiver's transmitter to improve the second receiver's performance is transmitted from the second transceiver's transmitter via OOB to the first transceiver's receiver OOB detector to be used within the first transceiver to then adjust the first transceiver's transmitter. The measurement of the second transceiver's received payload data quality can be done in the second transceiver. The evaluation of that quality measurement into adjustments of the first transceiver's transmitter can be done in either the first or second transceiver or split between the two. In one case, the second transceiver's receiver contains this intelligence and transmits actual transmitter adjustment settings to the first transmitter. In another case, just the second transceiver's payload data signal quality measurement is transmitted OOB to the first transceiver and the first transceiver contains the intelligence to adjust it's transmitter to optimize the second transceiver's received payload data signal quality. A third case is certainly valid where part of the evaluation is performed in the second transceiver, some intermediate form of data (possibly containing both the received signal quality measurement and transmitter adjustment suggestions and other data besides) is transmitted OOB to the first transceiver where further evaluation is performed to determine the eventual settings the first transceiver applies to it's transmitter.

The transceiver modules 120a, 120b store module data 140a, 140b that includes diagnostic and operational data that is used by the modules 120a, 120b to control parameters governing the transmission of data over an optical fiber, such as output power, carrier frequency, bit period, duty cycle, rise time, fall time and the like. Module data 140a, 140b may also include data relating to receiving of data over an optical fiber such as tap settings for one or more equalizer, transmitter settings, eye profile, eye mask parameters, threshold, sensitivity, and the like. The module data 140 may include diagnostic data regarding itself and another module 120a, 120b to which it is connected. Such data may include the received power, recovered clock frequency, bit error rate, or the like, of a received signal. The diagnostic data may include tap settings, transmitter settings or other settings, including diagnostic data from a process or method described below.

The modules 120a, 120b are coupled to one another by data channels 130a, 130b and out-of-band (OOB) channels 150a, 150b. In a preferred embodiment, the data channels 130a, 130b and OOB channels 150a, 150b include the same physical medium, such as an optical fiber. For example, the data channels 130a, 130b may include high frequency modulation of an optical signal transmitted over an optical fiber whereas the OOB channel 150a, 150b may include low frequency modulation of the power envelope of the same optical signal, such as is disclosed in U.S. patent application Ser. No. 11/070,757, which is incorporated herein by reference. In other embodiments, the data channels 130a, 130b include optical signals transmitted over an optical fiber or wire whereas the OOB channels 150a, 150b include a radio frequency (RF) channel.

Payload data is transmitted over the data channels 130a, 130b by the transceiver modules 120a, 120b. Diagnostic and configuration data included in the module data 140 can be communicated to other transceiver modules 120a, 120b in the OOB channel 150a, 150b.

The transceiver modules 120a, 120b are configured to cooperate to control the transmitter settings of at least one of the TOSA assemblies to optimize the transmission of payload data over the data channels 130a, 130b by sending information between the transceiver modules 120a, 120b in the OOB channels 150a, 150b. One exemplary method will now be discussed in more detail, beginning with reference to FIG. 2.

Figure 2:
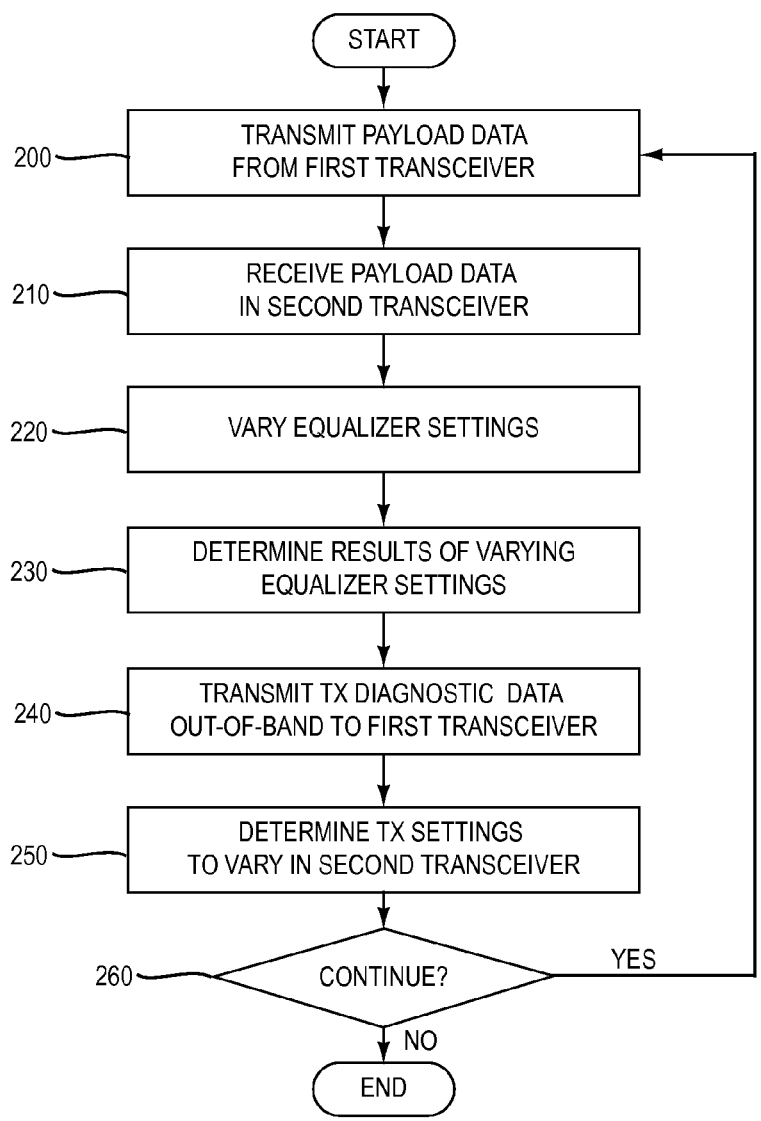
FIG. 2 illustrates a method of controlling communication between two transceiver modules according to one example.

FIG. 2 illustrates one exemplary method for controlling communication between optical transceiver modules. In the illustrated example, the method begins at step 200 by transmitting payload data, sometimes referred to as network data, from a first optical transceiver module to a second optical transceiver module over an optical link.

At step 210, the second optical transceiver module receives the payload data. The payload data can then be passed through an electronic dispersion compensation (EDC) system. As the payload data passes through the EDC system, one or more equalizer setting is varied at step 220 and the result of varying the equalizer setting is determined at step 230. Transmitter adjustment suggestions possibly including other related to the determination made at step 230 is then transmitted in an out-of-band (OOB) channel to the first transceiver module at step 240. The first transceiver module then determines which, if any, transmission settings to vary at step 250. If the process is to continue YES, determination 260, the first transceiver adjusts the settings on subsequent data transmissions, which begin again step 200. Further details of one exemplary method according to FIG. 2 will now be discussed in more detail with reference to FIG. 3.

As introduced, step 200 includes transmitting a data payload from a first transceiver 300a to a second transceiver 300b. In particular, the first transceiver 300a includes a transmitter optical sub-assembly (TOSA) 301. The transceivers 300a, 300b can be configured similarly. In the illustrated example, the transceivers 300a, 300b are substantially similar. One exemplary method will be discussed with reference to FIG. 3 in which the first transceiver 300a transmits a data payload in a data channel 130a over an optical link that is received by the second transceiver 300b and the second receiver 300b transmits diagnostic information in optical link in an out-of-band channel 150b. Accordingly, step 210 of FIG. 2 will be described with reference to the second receiver 300b. It will be appreciated that a similar or identical process can occur simultaneously in which the second transceiver 300b transmits payload data in the data channel 130b to the first transceiver 300a and the first transceiver 300a transmits diagnostic data in an out-of-band channel 150a to the second transceiver 300b. Accordingly, a discussion of one of the transceivers can be equally applicable to the other transceiver.

Figure 3:
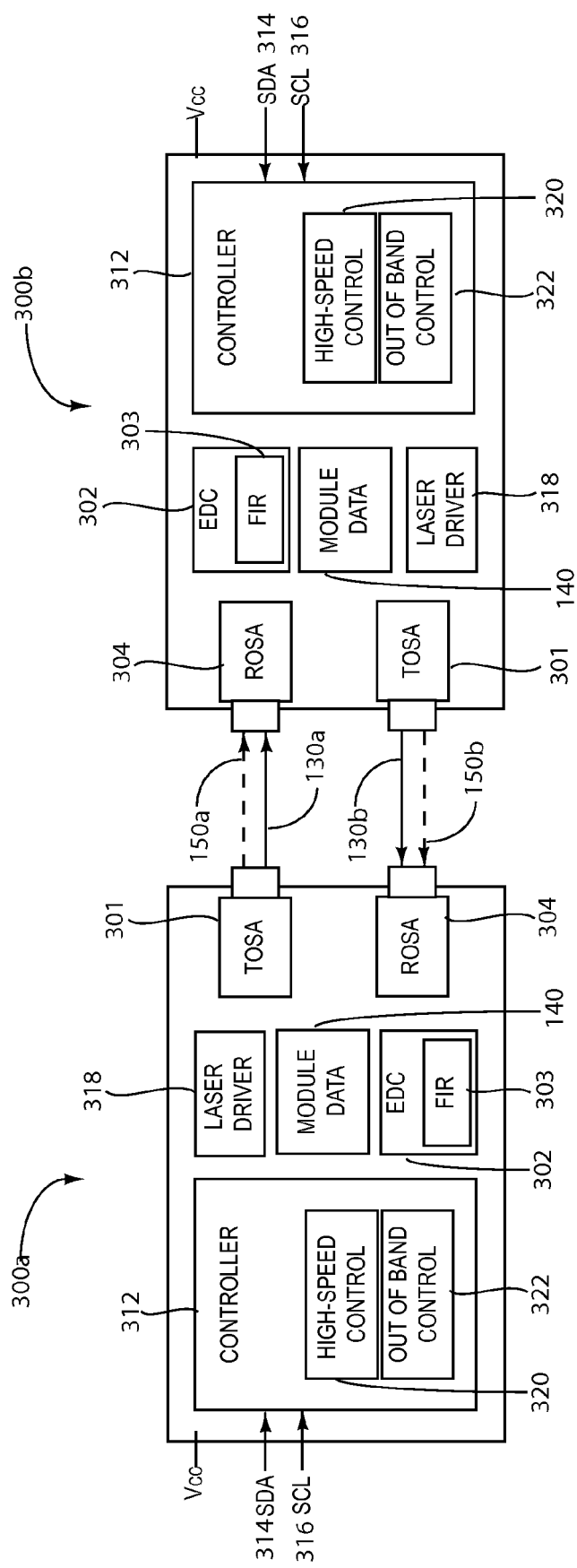
FIG. 3 illustrates communication between two transceiver modules according to one example.

Referring briefly again to FIG. 2, step 220 includes varying equalizer settings in the second transceiver 300b. For example, as illustrated in FIG. 3, the second transceiver 300b can be configured to support enhanced transmission over multimode fiber using an electronic dispersion compensation (EDC) integrated circuit (IC) 302 connected to a receiver optical subassembly (ROSA) 304 in the receive path via data lines. The EDC IC 302 can include a finite impulse response (FIR) filter 303. The FIR filter can include any number of taps that apply a gain to at various incremental portions of some interval of the data payload. In at least one example, the taps can apply gains at increments that are smaller than a bit length. Any size interval can be divided into any number of increments such that any number of taps may be used.

In at least one example, the EDC ICs 302 may be positioned within the transceivers 300a, 300b. In other examples, the EDC ICs 302 can be positioned with the network devices 110a, 10b. In particular, the EDC ICs 302 can be located in the host equipment on the receiving data path instead of within the transceiver itself. In such an example, the transceiver has a substantially linear receive signal path consisting of just the preamp and possibly a linear buffer amp so as to deliver to the host's EDC system a hi-fi replica of the actual received signal with limited or no processing other than amplification. In such a configuration, the host system can perform the same processes described elsewhere and create similar data. The host-generated transmitter adjustment suggestions and other diagnostic data created by the receiving host equipment could then be written by the host via the receiving transceiver's management interface, such as an I2C bus, into predetermined data locations or through a predetermined set of commands for subsequent transfer OOB to the distant transmitter. The distant transmitter would not care whether it's adjustment suggestions and other diagnostic data was created within the receiving transceiver or host device; it would be handled the same as described above.

The transceiver 300b also contains a control system 312 that can apply gains to the taps and determine how performance of the EDC IC 302 varies with the changes to the taps. The control system 312 can also control a number of additional functions. These include setup, control and temperature compensation of various additional elements of the transmit and receive paths, and implementation of diagnostics functions.

As introduced in FIG. 2, the method includes determining the results of varying the equalizer settings. For example, as illustrated in FIG. 3, diagnostic functions can include the calculation of how the performance of the EDC IC 302 varies in response to changes to the taps. In at least one example, the control system 312 calculates parameters of an eye diagram based on the output of the EDC IC 302. In particular, the EDC IC can calculate the mean-squared error (MSE) associated with the output of the EDC IC as the tap settings are varied. The control system 312 can further integrate the results over a period of time to determine which tap settings yield improved results. These tap settings can then be stored as part of the module data 140 described above.

In at least one example, the control system 312 is further connected to the host system through a 2-wire serial interface that includes a clock line 316 (SCL) and data line 314 (SDA). The control system 312 can be connected by a serial data path 320 to the EDC IC 302. The EDC IC 302 is designed such that the current state of the EDC FIR filter 303 tap weights can be reported on this serial connection 320 as digital values.

Other diagnostics functions can be provided in the embodiment described above. For example, an alarm flag and associated interrupt to the host equipment could be set if the EDC tap weights indicate that the link is beyond the limits of the EDC IC (for example, if a number of tap weights were set at their maximum possible value). Finally, the IC could directly provide the data on the tap weights to the host system. The tap weights can be used to calculate transmitter settings for the first transceiver 302a. The transmitter settings can be calculated in either the first transceiver 302a of in the second transceiver 302b. For ease of reference, transmitter settings calculated in the second transceiver and/or tap settings transmitted to the first transceiver 302a can be referred to as transmitter diagnostic data. As introduced in FIG. 2, step 240 of the exemplary method of controlling communication between transceivers includes transmitting transmitter diagnostic data in an out-of-band channel 150b from the second transceiver 300b to the first transceiver 300a.

One exemplary process for transmitter diagnostic data will now be described in more detail. As introduced above with reference to FIG. 3, each of the transceivers 300a, 300b include a transmitter optical subassembly (TOSA) 301 for transmitting signals across a physical link. Each transceiver 300a, 300b also includes a receiver optical subassembly (ROSA) 302 for receiving optical signals across a physical link. The control system 312 can include and/or be connected to a high-speed data control 320. The high-speed data control 320 may include a high-speed modulator that modulates the power output of a signal power source such as a laser in the TOSA 301 such that the high-speed data is converted to a form that can be transmitted across the physical link. The high-speed data control 318 modulates the TOSA 301 to produce a high-speed physical layer data signal. The laser driver 318 can also include and/or be connected to an out-of-band data control 322. The out-of-band data control 322 further modulates the laser in the TOSA 301 using an out-of-band data modulator such that an out-of-band data stream is modulated onto the high-speed data signal to produce an outgoing double modulated signal that includes high-speed and out-of-band data.

The modulations of the out-of-band data appear as a change in peak power of the outgoing double modulated signal. Thus the outgoing double modulated signal includes both high-speed data and out-of-band data. The out-of-band data may be modulated using a number of different modulation techniques including, but not limited to, phase-shift keying, binary phase-shift keying, quadrature phase-shift keying, and Manchester encoding. The out-of-band data may actually have a frequency range with orders of magnitude less than the in-band data.

To perform receiving functions, the ROSA 304 includes a signal reception element such as a photodiode that receives an incoming double modulated signal. The ROSA 304 sends all or portions of the incoming double modulated signal to the out-of-band data control 322 and the high-speed data control 320. The out-of-band data control 322 may include an out-of-band detector that extracts the out-of-band data from the incoming double modulated signal. The high-speed data control 320 may include a high-speed data amplifier that extracts high-speed data from the incoming double modulated signal. The high-speed data may also be sent to the EDC, such as to determine transmitter settings by varying tap settings in the FIR filter 303 as discussed.

As previously introduced, in addition to sending transmitter diagnostic data in an out-of-band channel, step 250 of FIG. 2 also includes determining which transmitter settings, to vary, if any. As shown in FIG. 3, the transmitter diagnostic data is extracted from the out-of-band data by the out-of-band data control 322. The control system 312 then processes this information as appropriate to vary settings of the high-speed data control 320.

These settings can include any number of settings to adjust the output of the TOSA 301 that can result in improved communication between the transceivers 300a, 300b. Payload data can then be sent from the TOSA 301 in the first transceiver 300a to the second transceiver 300b in the data channel 130a. Additionally, transmitter diagnostic settings can be sent from the first transceiver 300a to the second transceiver 300b in the OOB channel 130a based on an analysis of payload data coming from the other direction.

Accordingly, such a process can provide for forward-looking changes to the output of the TOSA 301 to improve signals received by another transceiver. Further, these changes can be made continuously and in both directions.

Accordingly, the EDC controller in a receiver may be enabled to manipulate the transmitter settings through OOB communication methods as part of the receiver's EDC tuning algorithm. The transmitter adjustments would appear to be "virtual taps" added to the receiver's existing EDC equalizer. Periodically, a packet of data containing the receiver's suggestions for the transmitter settings can then be sent back to the transmitter, which would adjust it's output accordingly. These packets would be small, conceivably as little as 10 bytes, so the inherently slow OOB data link would still give useful performance in real time. Such a system and method may eliminate the need for the DFE filter in the receiver altogether, and could simplify the FIR filter required to achieve a given performance level. In particular, the transmitter's data dependent equalization is "feed forward" and can be less susceptible to oscillation attendant to DFE equalizers.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of controlling communication between transceivers, comprising:
   transmitting payload data from a transmitter of a first transceiver in a data channel of a physical link to a receiver of a second transceiver, the second transceiver further including an equalizer;
   varying equalizer settings in the equalizer;
   analyzing effects of varying equalizer settings to determine transmitter diagnostic settings for the first transceiver; and
   transmitting the transmitter diagnostic settings from a transmitter of the second transceiver in an out-of-band channel of a physical link to a receiver of the first transceiver.

2. The method of claim 1, further including varying transmitter settings in the first transceiver in response to the transmitter diagnostic settings.

3. The method of claim 2, further including transmitting payload data from the transmitter of the first transceiver using the transmitter settings varied in response to the transmitter diagnostic settings.

4. The method of claim 1, wherein the physical links between the transceivers includes a fiber-optic link.

5. The method of claim 1, wherein the equalizer includes an electronic dispersion compensation system (EDC system).

6. The method of claim 5, wherein varying equalizer settings include varying tap settings in a digital filter in the EDC system.

7. The method of claim 6, wherein varying tap settings in a digital filter include varying tap settings in a finite impulse response filter.

8. The method of claim 6, wherein transmitting the transmitter diagnostic data in the out-of-band channel includes modulating a power amplitude of a payload data transmission.

9. The method of claim 1, wherein analyzing the effects of varying equalizer settings to determine transmitter diagnostic settings for the first transceiver includes calculating an eye-diagram.

10. A transceiver module, comprising:
    a transmitter;
    a receiver configured to receive a data payload from a physical link;
    an equalizer having operatively associated with the receiver, the equalizer system including a digital filter having a plurality of taps configured to apply gains to the data payload; and
    a control system operatively associated with the transmitter, the receiver, and the equalizer, wherein the control system is configured to vary tap settings, to analyze results of varying the tap settings to determine transmitter diagnostic settings, and to cause the transmitter to transmit the transmitter diagnostic settings over a physical link in an out-of-band channel to a second transceiver.

11. The transceiver module of claim 10, wherein the transmitter includes a transmitter optical sub-assembly.

12. The transceiver module of claim 10, wherein the receiver includes a receiver optical sub-assembly.

13. The transceiver module of claim 10, wherein the equalizer includes an electronic dispersion compensation system.

14. The transceiver module of claim 13, wherein the electronic dispersion compensation system includes a finite impulse response filter.

15. The transceiver module of claim 10, wherein the transmitter is configured to simultaneously transmit a data payload over the physical link.

16. A communication system, comprising:
    a first transceiver having a control system operatively with a transmitter to transmit a data payload in a data channel over a physical link;
    a second transceiver having a receiver configured to receive the data payload over the physical link, the second transceiver further including an equalizer having operatively associated with the receiver, the equalizer system including a digital filter having a plurality of taps configured to apply gains to the data payload, and a control system operatively associated with the transmitter, the receiver, and the equalizer, wherein the control system is configured to vary tap settings, to analyze results of varying the tap settings to determine transmitter diagnostic settings, and to cause the transmitter to transmit the transmitter diagnostic settings over a physical link in an out-of-band channel to the first transceiver.

17. The communication system of claim 16, the first transceiver further including a receiver configured to receive transmitter diagnostic settings in the out-of-band channel from the first transceiver.

18. The communication system of claim 17, wherein the control system is configured to change transmitter settings in the transmitter and to transmit payload data over the physical link using the transmitter settings.

19. The communication system of claim 16, wherein the physical link is a fiber optical cable.

20. The communication system of claim 16, wherein the equalizer is an electronic dispersion compensation system.

21. The communication system of claim 20, wherein the electronic dispersion compensation system includes a finite impulse response filter.

22. The communication system of claim 20, wherein the control system is positioned within a host device.

23. The communication system of claim 22, wherein the host device generates transmitter diagnostic settings and transfers the transmitter diagnostic settings to the second transceiver through a management interface for subsequent transmission.

* * * * *